United States Patent
Onda

(10) Patent No.: US 11,233,939 B2
(45) Date of Patent: Jan. 25, 2022

(54) COMMUNICATION APPARATUS, CONTROL METHOD THEREOF, AND RECORDING MEDIUM THEREOF

(71) Applicant: CANON KABUSHIKI KAISHA, Tokyo (JP)

(72) Inventor: Taiga Onda, Funabashi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/838,899

(22) Filed: Apr. 2, 2020

(65) Prior Publication Data
US 2020/0322543 A1    Oct. 8, 2020

(30) Foreign Application Priority Data
Apr. 8, 2019 (JP) .............................. JP2019-073611

(51) Int. Cl.
*H04N 5/232* (2006.01)

(52) U.S. Cl.
CPC ... *H04N 5/232411* (2018.08); *H04N 5/23206* (2013.01); *H04N 5/23245* (2013.01)

(58) Field of Classification Search
CPC ......... H04N 5/232411; H04N 5/23206; H04N 5/23245
See application file for complete search history.

(56) References Cited

U.S. PATENT DOCUMENTS

| | | | | |
|---|---|---|---|---|
| 6,741,271 B1* | 5/2004 | McConica | ........ | H04L 29/12113 709/204 |
| 7,139,018 B2* | 11/2006 | Grosvenor | ......... | H04N 5/23206 348/211.3 |
| 2007/0058074 A1* | 3/2007 | Yamagishi | ......... | H04N 5/23212 348/372 |
| 2009/0055670 A1* | 2/2009 | Yamamoto | ....... | H04N 5/232411 713/323 |
| 2010/0085472 A1* | 4/2010 | Chen | ................ | H04N 5/232411 348/372 |
| 2011/0050926 A1* | 3/2011 | Asano | .................. | H04N 1/4406 348/211.2 |
| 2015/0121106 A1* | 4/2015 | Eckert | ..................... | G06F 1/324 713/323 |

FOREIGN PATENT DOCUMENTS

JP    2012-248961 A    12/2012

\* cited by examiner

*Primary Examiner* — Timothy J Henn
(74) *Attorney, Agent, or Firm* — Canon U.S.A., Inc. I.P. Division

(57) ABSTRACT

A communication apparatus includes a communication unit configured to communicate with an external apparatus, an operation unit configured to accept a user operation, and a control unit. The control unit is configured to execute communication functions including a client function for operating as a client and a server function for operating as a server in communicating with the external apparatus via the communication unit. Further, the control unit is configured to, in a case where the client function for operating as a client is executed and the server function for operating as a server is not executed, execute a first power saving function for disabling the communication function based on a lapse of a predetermined time without acceptance of the user operation, and, in a case where both the client and server functions are executed in parallel, not execute the first power saving function.

16 Claims, 11 Drawing Sheets

FIG.3A

| COMMUNICATION SETTINGS | |
|---|---|
| 310 — COMMUNICATION FUNCTIONS | OFF |
| 311 — POWER SAVING FUNCTION | OFF |
| 312 — SELECT COMMUNICATION FUNCTION(S) | |

FIG.3B

| COMMUNICATION SETTINGS | |
|---|---|
| 310 — COMMUNICATION FUNCTIONS | ON |
| 311 — POWER SAVING FUNCTION | OFF |
| 312 — SELECT COMMUNICATION FUNCTION(S) | |

FIG.3C

| COMMUNICATION SETTINGS | |
|---|---|
| 310 — COMMUNICATION FUNCTIONS | ON |
| 311 — POWER SAVING FUNCTION | ON |
| 312 — SELECT COMMUNICATION FUNCTION(S) | |

FIG.3D

| SELECT COMMUNICATION FUNCTION(S) |
|---|
| 320 — SETTING 1: IMAGE TRANSMISSION |
| 321 — SETTING 2: REMOTE CAMERA CONTROL |
| 322 — SETTING 3: IMAGE TRANSMISSION/ REMOTE CAMERA CONTROL |

FIG.3E

| CONNECTION SETTING | SETTING 1 |
|---|---|
| 330 — CONNECT | |
| 331 — CHANGE SETTING | |

COMMUNICATION APPARATUS, CONTROL METHOD THEREOF, AND RECORDING MEDIUM THEREOF

BACKGROUND

Field

The present disclosure relates to a communication apparatus that can execute communication functions in parallel.

Description of the Related Art

Recent communication apparatuses such as a single-lens reflex camera, a video camera, and a smartphone can execute a power saving function to reduce power consumption. The power saving function is mainly executed when an electronic device enters a certain state, like where the electronic device is not operated by a user for a predetermined time, or when the power saving function is activated by the user's manual operation. In executing the power saving function, the communication apparatus can individually control the power of members not related to running functions.

Japanese Patent Application Laid-Open No. 2012-248961 discusses an image processing apparatus capable of communication, where a unit having a function used to execute a job is turned on and an unused unit is shifted to a power off state.

If a communication apparatus executes a plurality of communication functions, a processing discrepancy can occur between the power saving functions of the respective communication functions. For example, the communication apparatus stops energization of a communication unit by the power saving function of a communication function. On the other hand, the power saving function of another communication function causes the communication apparatus to disconnect a connection with a communication partner but not stop the energization of the communication unit. A processing discrepancy can thus occur between the power saving functions of the respective communication functions. If such communication functions are executed in parallel and both the power saving functions are enabled, the processing of the power saving function of one of the communication functions can interfere with the operation of a different one of the communication functions.

SUMMARY

According to various embodiments of the present disclosure, a communication apparatus includes a communication unit configured to communicate with an external apparatus, an operation unit configured to accept a user operation, and a control unit, wherein the control unit is configured to execute communication functions including a client function for operating as a client and a server function for operating as a server in communicating with the external apparatus via the communication unit, wherein the control unit is configured to, in a case where the client function for operating as a client is executed and the server function for operating as a server is not executed, execute a first power saving function for disabling the communication function based on a lapse of a predetermined time without acceptance of the user operation, and wherein the control unit is configured to, in a case where both the client and server functions are executed in parallel, not execute the first power saving function.

Further features will become apparent from the following description of various embodiments with reference to the attached drawings.

BRIEF DESCRIPTION OF THE DRAWINGS

FIG. 3A illustrates an example of a screen displaying initial settings of communication settings of the digital camera according to the first embodiment. FIG. 3B illustrates an example of a screen displaying the communication settings of the digital camera according to the first embodiment. FIG. 3C illustrates an example of the screen displaying the communication settings of the digital camera according to the first embodiment. FIG. 3D illustrates an example of a screen listing communication functions of the digital camera according to the first embodiment. FIG. 3E illustrates an example of a screen for setting a communication function of the digital camera according to the first embodiment.

DESCRIPTION OF THE EMBODIMENTS

Embodiments of the present disclosure will be described below with reference to the drawings. The following embodiments are examples of means for implementing embodiments of the present disclosure, and modifications and changes may be made as appropriate depending on the configuration and various conditions of communication apparatuses to which the embodiments are applied. The embodiments may be combined as appropriate.

<External Views of Digital Camera 100>

Figure 1A:
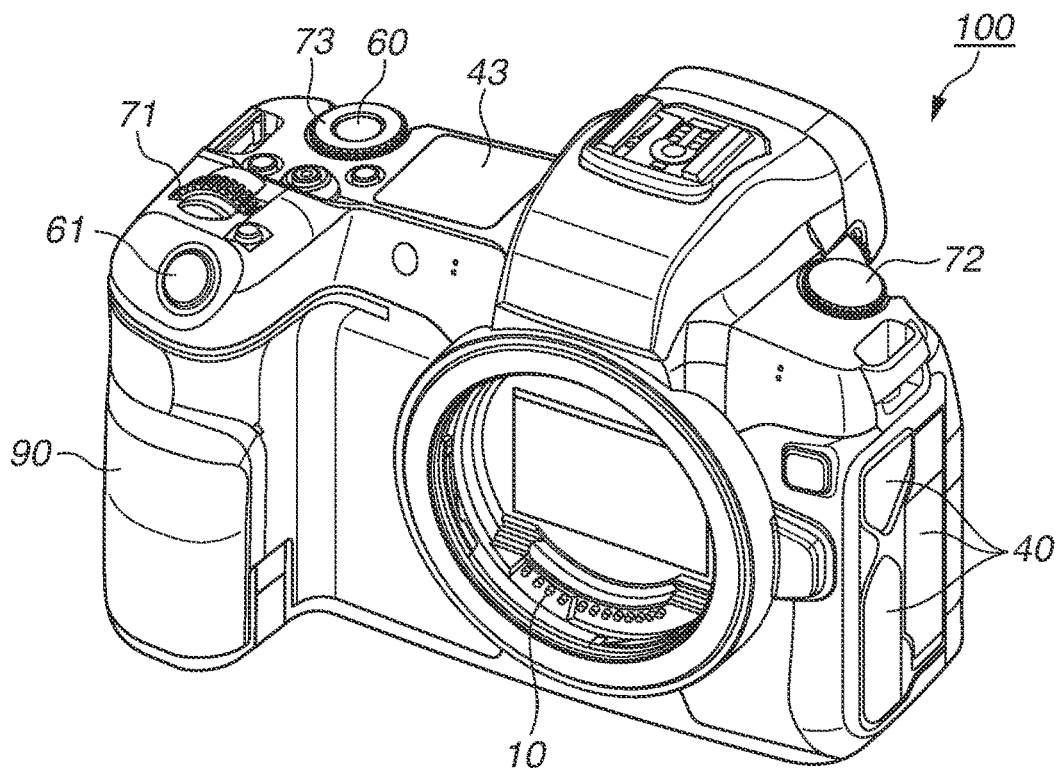
FIG. 1A illustrates an example of a front perspective view of a digital camera according to a first embodiment.
Figure 1B:
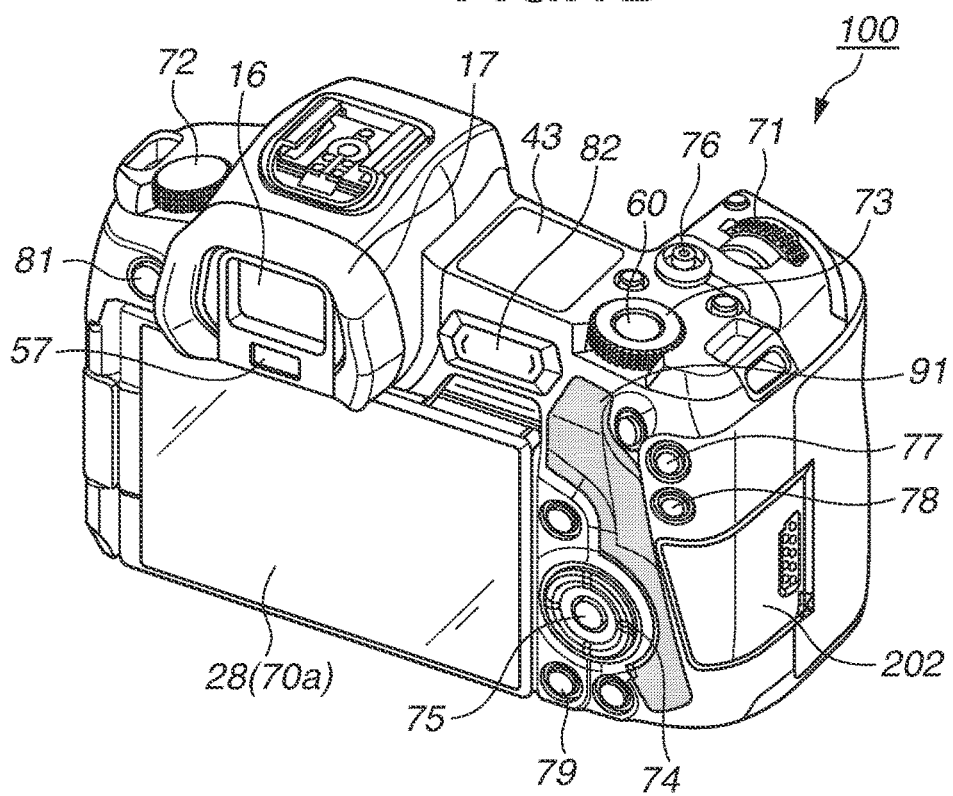
FIG. 1B illustrates an example of a rear perspective view of the digital camera according to the first embodiment.

A first embodiment will be described. FIGS. 1A and 1B are external views of a digital camera 100 that is an example of a communication apparatus. FIG. 1A illustrates an example of a front perspective view of the digital camera 100. FIG. 1B is an example of a rear perspective view of the digital camera 100. While the digital camera 100 is described here as an example of the communication apparatus, the communication apparatus is not limited thereto. For example, the communication apparatus may be an information processing apparatus capable of communication such as a mobile phone, a game machine, a tablet device, a wearable device, a smartphone, or a personal computer.

A display unit 28 is a display unit located on the back of the digital camera 100, and displays images and various types of information. A touch panel 70a can detect touch operations on the display surface (touch operation surface) of the display unit 28. An extra-viewfinder display unit 43 is a display unit located on the top side of the digital camera 100. The extra-viewfinder display unit 43 displays various setting values of the digital camera 100, including a shutter speed and an aperture. A shutter button 61 is an operation member for giving imaging instructions. A mode change switch 60 is an operation member for switching between various modes. A terminal cover 40 is a cover that protects a connector (not illustrated) for a connection cable for connecting the digital camera 100 to an external device.

A main electronic dial 71 is a rotating operation member. Setting values such as the shutter speed and the aperture can be changed by rotating the main electronic dial 71. A power switch 72 is an operation member for switching on/off the power of the digital camera 100. A sub electronic dial 73 is a rotating operation member. A selection frame (cursor) can be moved and images can be fast forwarded by rotating the sub electronic dial 73. A four-way directional pad 74 is configured such that its top, bottom, left, and right portions can be pressed. Processing can be performed based on the pressed portion of the four-way directional pad 74. A set button 75 is a push button and mainly used to determine a selected item.

A moving image button 76 is used to give instructions to start and stop moving image capturing (recording). An automatic exposure (AE) lock button 77 is a push button. An exposure state can be locked by pressing the AE lock button 77 in an imaging standby state. A zoom button 78 is an operation button for switching on/off a zoom mode in a live view (LV) display in an imaging mode. An LV image can be magnified or reduced by operating the main electronic dial 71 with the zoom mode ON. In a playback mode, the zoom button 78 functions as an operation button for enlarging the playback image or increasing the enlargement ratio. A playback button 79 is an operation button for switching between the imaging mode and the playback mode. If the playback button 79 is pressed in the imaging mode, the digital camera 100 enters the playback mode, whereby the latest among the images recorded on a recording medium 200 (to be described below) can be displayed on the display unit 28. A menu button 81 is a push button used to make an instruction operation to display a menu screen. If the menu button 81 is pressed, a menu screen on which various settings can be made is displayed on the display unit 28. The user can intuitively make various settings by using the menu screen displayed on the display unit 28, the four-way directional pad 74, and the set button 75.

A touch bar 82 (multifunction bar, or M-Fn bar) is a line-shaped touch operation member (line touch sensor) that can accept touch operations. The touch bar 82 is located at a position where touch operations can be made (touches can be made) with the thumb of the right hand gripping a grip part 90 in a normal gripping position (vendor-recommended gripping position). The touch bar 82 is an operation unit that can accept a tap operation (operation of making a touch and releasing the touch within a predetermined period without a move) and a lateral slide operation (operation of making a touch and moving the touch position without releasing the touch) on the touch bar 82. The touch bar 82 is an operation member different from the touch panel 70a and has no display function.

A communication terminal 10 is a communication terminal for the digital camera 100 to communicate with a lens unit 150 (to be described below; detachable). An eyepiece unit 16 is an eyepiece unit of an eyepiece viewfinder 17 (look-through viewfinder). The user can visually observe a video image displayed on an internal electronic viewfinder (EVF) 29 (to be described below) through the eyepiece unit 16. An eye detection unit 57 is an eye detection sensor that detects whether the user (photographer) is putting an eye on the eyepiece unit 16. A lid 202 is a lid for covering a slot in which the recording medium 200 (to be described below) is accommodated. The grip part 90 is a holding part having a shape easy for the user to grip by the right hand when holding the digital camera 100. The shutter button 61 and the main electronic dial 71 are located at positions operable by the index finger of the right hand when the user holds the digital camera 100 by gripping the grip part 90 with the little finger, the ring finger, and the middle finger of the right hand. The sub electronic dial 73 and the touch bar 82 are located at positions operable by the thumb of the right hand in the same state. A thumb rest part 91 (thumb standby position) is a grip member located at a position where the thumb of the right hand gripping the grip part 90 is easily placed when none of the operation members on the back side of the digital camera 100 is operated. The thumb rest part 91 includes a rubber member for a better hold (gripping feel).

<Configuration Block Diagram of Digital Camera 100>

Figure 2:
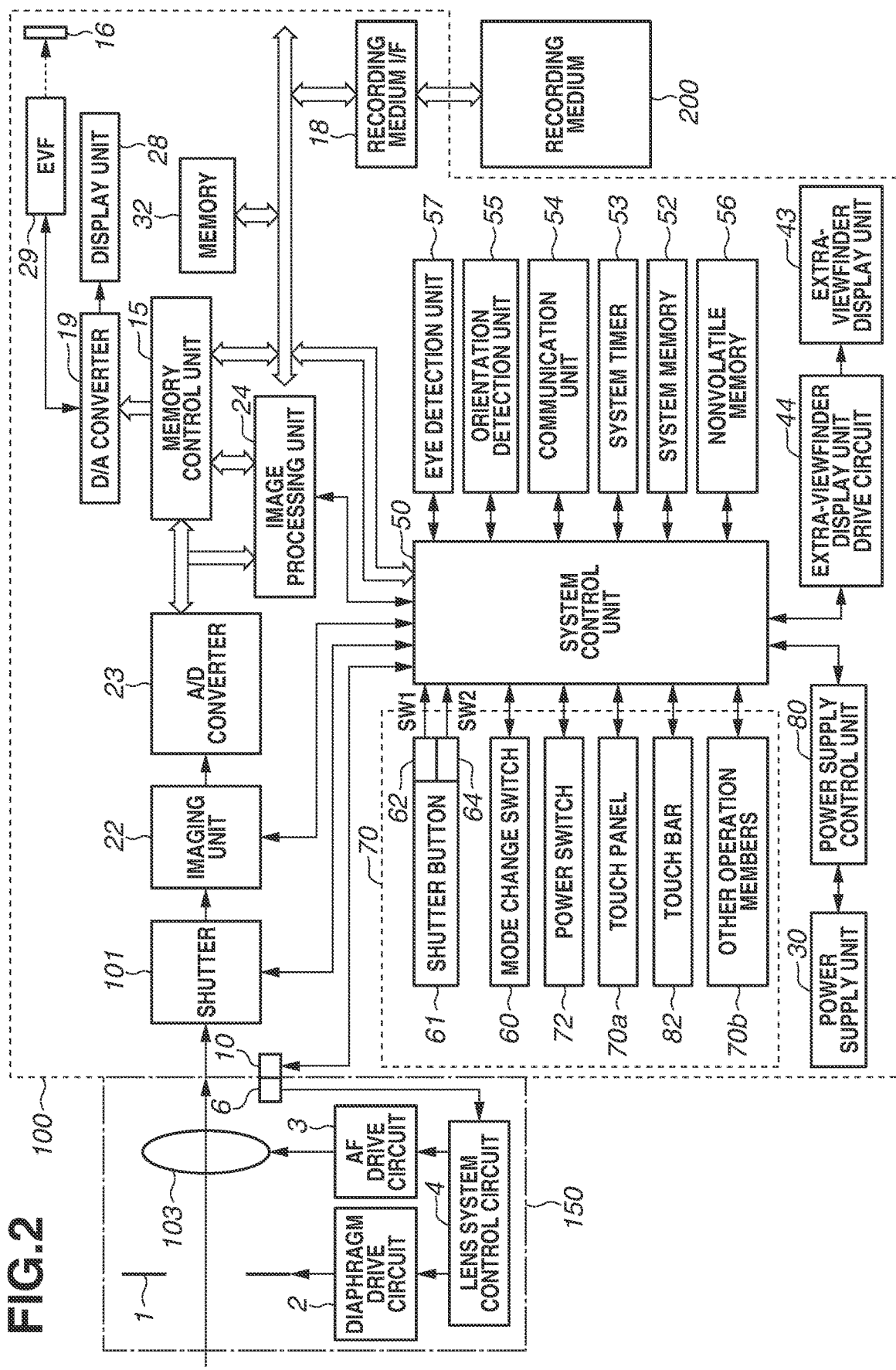
FIG. 2 is a block diagram illustrating an example of a circuit configuration of the digital camera according to the first embodiment.

FIG. 2 is a block diagram illustrating a configuration example of the digital camera 100. The lens unit 150 is a lens unit including an interchangeable imaging lens. A lens 103 typically consists of a plurality of lenses, but is simplified and depicted as a single lens in FIG. 2. A communication terminal 6 is a communication terminal for the lens unit 150 to communicate with the digital camera 100. The communication terminal 10 is a communication terminal for the digital camera 100 to communicate with the lens unit 150. The lens unit 150 communicates with a system control unit 50 via the communication terminals 6 and 10. The lens unit 150 controls a diaphragm 1 by a lens system control circuit 4 inside via a diaphragm drive circuit 2. The lens unit 150 focuses by the lens system control circuit 4 changing the position of the lens 103 via an automatic focus (AF) drive circuit 3.

A shutter 101 is a focal plane shutter that can freely control the exposure time of an imaging unit 22 under control of the system control unit 50.

The imaging unit 22 is an image sensor including a charge-coupled device (CCD) or complementary metal-oxide-semiconductor (CMOS) sensor for converting an optical image into an electrical signal. The imaging unit 22 may include an imaging plane phase difference sensor that outputs defocus amount information to the system control unit 50. An analog-to-digital (A/D) converter 23 converts an analog signal output from the imaging unit 22 into a digital signal.

An image processing unit 24 performs predetermined processing (such as pixel interpolation, reduction and other resize processing, and color conversion processing) on data from the A/D converter 23 or data from a memory control unit 15. The image processing unit 24 performs predetermined calculation processing using captured image data. The system control unit 50 performs exposure control and ranging control based on the calculation result obtained by the image processing unit 24. Through-the-lens (TTL) AF processing, AE processing, and electronic flash (EF) (preliminary flash emission) processing are thereby performed. The image processing unit 24 further performs predetermined calculation processing using the captured image data, and TTL automatic white balance (AWB) processing is performed based on the obtained calculation result.

The output data from the A/D converter 23 is written to a memory 32 via the image processing unit 24 and the memory control unit 15. Alternatively, the output data from the A/D converter 23 is written to the memory 32 via the memory control unit 15 without the intermediary of the image processing unit 24. The memory 32 stores the image data obtained by the imaging unit 22 and digitally converted by the A/D converter 23, and image data to be displayed on the display unit 28 and the EVF 29. The memory 32 has a sufficient storage capacity to store a predetermined number of still images and a predetermined duration of moving images and audio data.

The memory 32 also serves as an image display memory (video memory). A digital-to-analog (D/A) converter 19 converts image display data stored in the memory 32 into analog signals, and supplies the analog signals to the display unit 28 and the EVF 29. The image display data written to the memory 32 is thereby displayed on the display unit 28 and the EVF 29 via the D/A converter 19. The display unit 28 and the EVF 29 each are a display such as a liquid crystal display (LCD) or an organic electroluminescence (EL) display, and provide display based on the analog signal from the D/A converter 19. An LV display can be provided by converting a digital signal that is A/D-converted by the A/D converter 23 and stored in the memory 32 into an analog signal by the D/A converter 19 and successively transferring the analog signal to the display 28 or the EVF 29 for display. An image displayed by the LV display will hereinafter be referred to as an LV image.

Various setting values of the digital camera 100, including the shutter speed and the aperture, are displayed on the extra-viewfinder display unit 43 via an extra-viewfinder display unit drive circuit 44.

A nonvolatile memory 56 is an electrically erasable and recordable memory. An example of the nonvolatile memory 56 is an electrically erasable programmable read-only memory (EEPROM). Operating constants and a program of the system control unit 50 are recorded in the nonvolatile memory 56. As employed herein, the program refers to one for executing various flowcharts to be described below in the present embodiment.

The system control unit 50 is a control unit including at least one processor or circuit, and controls the entire digital camera 100. The system control unit 50 implements various types of processing according to the present embodiment to be describe below by executing the program recorded in the foregoing nonvolatile memory 56. A system memory 52 is a volatile memory. An example of the system memory 52 is a random access memory (RAM). The system control unit 50 loads the operating constants and variables of the system control unit 50 and the program read from the nonvolatile memory 56 into the system memory 52. The system control unit 50 also performs display control by controlling the memory 32, the D/A converter 19, and the display unit 28.

A system timer 53 is a clocking unit that measures time used for various types of control and the time of a built-in clock.

A power supply control unit 80 includes a battery detection circuit, a direct-current-to-direct-current (DC-DC) converter, and a switch circuit that switches blocks to be energized. The power supply control unit 80 detects the presence or absence of a mounted battery, the type of battery, and the remaining battery level. The power supply control unit 80 controls the DC-DC converter based on the detection results and instructions from the system control unit 50, and supplies predetermined voltages to various components including the recording medium 200 for predetermined periods. A power supply unit 30 includes a primary battery such as an alkaline battery or a lithium battery, a secondary battery such as a nickel-cadmium (NiCd) battery, a nickel metal halide (NiMH) battery, or a lithium-ion (Li) battery, and/or an alternating current (AC) adapter.

A recording medium interface (I/F) 18 is an I/F with the recording medium 200 such as a memory card or a hard disk. The recording medium 200 is one for recording captured images, and includes a semiconductor memory or a magnetic disk.

A communication unit 54 transmits/receives video signals and audio signals to/from an external device connected wirelessly or via a cable. The communication unit 54 can also connect to a wireless local area network (LAN) and the Internet. The communication unit 54 can also communicate with an external terminal by Bluetooth (registered trademark) and Bluetooth Low Energy. The communication unit 54 can transmit the images (including the LV image) captured by the imaging unit 22 and the images recorded in the recording medium 200, and receive image data and various other types of information from an external apparatus. The digital camera 100 according to the present embodiment has at least one communication function for operating as a client (hereinafter, referred to as a client function) and at least one communication function for operating as a server (hereinafter, referred to as a server function) in client-server communications. The digital camera 100 according to the present embodiment can use a plurality of communication functions in parallel. By the client function, the digital camera 100 requests a server to provide a service. By the server function, the digital camera 100 provides an external apparatus that is a client with a service based on a request received from the external apparatus.

An orientation detection unit 55 detects the orientation of the digital camera 100 with respect to the direction of gravity. Whether an image captured by the imaging unit 22 is one captured with the digital camera 100 in a landscape direction or one captured with the digital camera 100 in a portrait direction can be determined based on the orientation detected by the orientation detection unit 55. The system control unit 50 can add orientation information based on the orientation detected by the orientation detection unit 55 to the image file of the image captured by the imaging unit 22, or rotate and record the image. An acceleration sensor or a gyro sensor can be used as the orientation detection unit 55. The motion of the digital camera 100 (such as a pan, tilt, lift-up, or whether the digital camera 100 is at rest) can also be detected by using the acceleration sensor or gyro sensor that is the orientation detection unit 55.

The eye detection unit 57 is an eye detection sensor that detects approach (eye approach)/separation (eye separation) of an eye (object) to/from the eyepiece unit 16 of the eyepiece viewfinder 17 (hereinafter, referred to simply as a "viewfinder") (approach detection). The system control unit 50 switches display (display state) and non-display (non-display state) of the display unit 28 and the EVF 29 based on the state detected by the eye detection unit 57. More specifically, suppose that the digital camera 100 is at least in an imaging standby state and the display destination is automatically switched. During eye separation, the system control unit 50 turns on display of the display unit 28 as the display destination, and turns off display of the EVF 29. During eye approach, the system control unit 50 turns on display of the EVF 29 as the display destination, and turn off display of the display unit 28. For example, an infrared proximity sensor can be used as the eye detection unit 57 and the eye detection unit 57 can detect the approach of an object to the eyepiece unit 16 of the viewfinder 17 where the EVF 29 is built in. If an object approaches, infrared rays projected from a light projection unit (not illustrated) of the eye detection unit 57 are reflected from the object and received by a light reception unit (not illustrated) of the infrared proximity sensor. How close the object has approached to the eyepiece unit 16 (eye approach distance) can also be determined based on the amount of received infrared rays. In such a manner, the eye detection unit 57 performs eye detection for detecting the distance of proximity of the object to the eyepiece unit 16. If an object approaching within a predetermined distance to the eyepiece unit 16 from a non-eye approach state (non-approach state) is detected, the eye detection unit 57 detects that eye approach is made. If the object of which approach has been detected separates by a predetermined distance or more from the eye approach state (approach state), the eye detection unit 57 detects that eye separation is made. The threshold for detecting eye approach and the threshold for detecting eye separation may be different with a hysteresis, for example. After eye approach is detected, the eyepiece unit 16 is in the eye approach state until eye separation is detected. After eye separation is detected, the eyepiece unit 16 is in the non-eye approach state until eye approach is detected. The infrared proximity sensor is just an example, and other sensors that can detect approach of an eye or object to be considered as eye approach may be used as the eye detection unit 57.

An operation unit 70 is an input unit for accepting operations from the user (user operations). The operation unit 70 is used to input various operation instructions to the system control unit 50. As illustrated in FIG. 2, the operation unit 70 includes the mode change switch 60, the shutter button 61, the power switch 72, the touch panel 70a, and the touch bar 82. The operation unit 70 also includes the main electronic dial 71, the sub electronic dial 73, the four-way directional pad 74, the set button 75, the moving image button 76, the AE lock button 77, the zoom button 78, the playback button 79, and the menu button 81 as other operation members 70b.

The mode change switch 60 switches the operation mode of the system control unit 50 to any one of the following: a still image capturing mode, a moving image capturing mode, and a playback mode. The still image capturing mode includes the following modes: an automatic image capturing mode, an automatic scene determination mode, a manual mode, an aperture priority mode (Av mode), a shutter speed priority mode (Tv mode), and a program AE mode (P mode). Various scene modes that provide imaging scene-specific imaging settings are also included, as well as a custom mode. By using the mode change switch 60, the user can directly switch to any one of the foregoing modes. Alternatively, the user may once switch to a screen listing the imaging modes by using the mode change switch 60, and then selectively switch to one of the plurality of displayed imaging modes by using other operation members. The moving image capturing mode may similarly include a plurality of modes.

The shutter button 61 includes a first shutter switch 62 and a second shutter switch 64. The first shutter switch 62 turns on to generate a first shutter switch signal SW1 if the shutter button 61 is operated halfway, i.e., half pressed (imaging preparation instruction). Based on the first shutter switch signal SW1, the system control unit 50 starts imaging preparation operations such as AF processing, AE processing, AWB processing, and EF (preliminary flash emission) processing.

The second shutter switch 64 turns on to generate a second shutter switch signal SW2 if the shutter button 61 is completely operated, i.e., fully pressed (imaging instruction). Based on the second shutter switch signal SW2, the system control unit 50 starts a series of imaging processing operations including the reading of a signal from the imaging unit 22 to the writing of the captured image to the recording medium 200 as an image file.

The touch panel 70a and the display unit 28 may be integrally configured. For example, the touch panel 70a is configured to have a light transmittance not interfering with the display of the display unit 28, and is attached to the top layer of the display surface of the display unit 28. Input coordinates of the touch panel 70a and display coordinates on the display surface of the display unit 28 are associated with each other. A graphical user interface (GUI) that enables the user to make operations as if directly operating the screen displayed on the display unit 28 can thus be provided. The system control unit 50 can detect the following operations on or states of the touch panel 70a: That a finger or pen not having touched the touch panel 70a newly touches the touch panel 70a, i.e., a start of a touch (hereinafter, referred to as a touch-down);

A state where a finger or pen is touching the touch panel 70a (hereinafter, referred to as a touch-on);

That a finger or pen touching the touch panel 70a moves (hereinafter, referred to as a touch-move);

That a finger or pen having touched the touch panel 70a is separated (released) from the touch panel 70a, i.e., an end of a touch (hereinafter, referred to as a touch-up); and A state where nothing touches the touch panel 70a (hereinafter, referred to as a touch-off).

If a touch-down is detected, a touch-on is also detected at the same time. After a touch-down, a touch-on usually continues to be detected unless a touch-up is detected. If a touch-move is detected, a touch-on is also detected at the same time. If a touch-on is detected and the touch position does not move, a touch-move is not detected. After all the touching fingers and pen are detected to be touched up, a touch-off occurs.

Such operations and states and the position coordinates of the finger(s) and pen touching the touch panel 70a are notified to the system control unit 50 via an internal bus. The system control unit 50 then determines what operation (touch operation) is made on the touch panel 70a based on the notified information. If a touch-move is made, the moving direction of the finger or pen moving on the touch panel 70a can be determined in terms of vertical and horizontal components, separately, on the touch panel 70a based on a change in the position coordinates. If a touch-move over a predetermined distance or more is detected, the system control unit 50 determines that a slide operation is made. An operation of quickly moving a finger touching the touch panel 70a by some distance and immediately releasing the finger will be referred to as a flick. In other words, a flick is an operation of quickly running a finger over the touch panel 70a as if flicking. If a touch-move for a predetermined distance or more is detected to be made at a predetermined speed or more and a touch-up is immediately detected, a flick can be determined to be made (a flick can be determined to be made after a slide operation). A touch operation of simultaneously touching (multi-touching) a plurality of points (for example, two points) and bringing the touch positions close to each other is referred to as a pinch-in, and a touch operation of bringing the touch positions away from each other a pinch-out. A pinch-out and a pinch-in are referred to collectively as pinch operations (or simply pinches). The touch panel 70a may use any one of various systems of touch panels, including a resistive, capacitive, surface acoustic wave, infrared, electromagnetic induction, image recognition, and optical sensor systems. There are a system for detecting a touch based on contact with the touch panel and a system for detecting a touch based on approach of a finger or pen to the touch panel, either of which may be employed.

The system control unit 50 can detect the following operations on or states of the touch bar 82:

That a finger not having touched the touch bar 82 newly touches the touch bar 82, i.e., a start of a touch (touch-down);

A state where a finger is touching the touch bar 82 (touch-on);

That a finger touching the touch bar 82 moves (touch-move);

That a finger having touched the touch bar 82 is separated (released) from the touch bar 82, i.e., an end of a touch (touch-up); and A state where nothing touches the touch bar 82 (touch-off).

If a touch-down is detected, a touch-on is also detected at the same time. After a touch-down, a touch-on usually continues to be detected unless a touch-up is detected. If a touch-move is detected, a touch-on is also detected at the same time. If a touch-on is detected and the touch position does not move, a touch-move is not detected. After the touching finger is detected to be touched up, a touch-off occurs.

Such operations and states and the position coordinates of the finger touching the touch bar 82 are notified to the system control unit 50 via the internal bus. The system control unit 50 then determines what operation (touch operation) is made on the touch bar 82 based on the notified information. If a touch-move is made, the movement over the touch bar 82 in the horizontal direction (lateral direction) is detected. If the touch position is detected to be moved for a predetermined distance or more (moved by a predetermined amount or more), the system control unit 50 determines that a slide operation is made. If an operation of touching the touch bar 82 with a finger and releasing the touch within a predetermined time without a slide operation is performed, the system control unit 50 determines that a tap operation is made. In the present embodiment, the touch bar 82 is a capacitive touch sensor. However, any one of touch sensors of other systems may be used, which include a resistive, surface acoustic wave, infrared, electromagnetic induction, image recognition, and optical sensor systems.

<Setting of Communication Functions>

Now, a method for setting the communication functions of the digital camera 100 according to the present embodiment will be described. In the present embodiment, for example, the digital camera 100 displays a setting menu of the communication functions on the display unit 28, and the user sets the communication functions by operating the operation members included in the operation unit 70.

FIG. 3A illustrates an example of a screen for setting the communication functions of the digital camera 100. Using an item 310, the user can set whether to use (turn on or off) a communication function or communication functions of the digital camera 100. Using an item 311, the user can set whether to enable (turn on or off) a power saving function of the digital camera 100 while using the communication function(s) of the digital camera 100. Using an item 312, the user can select the communication function(s). By initial settings, the items 310 and 311 are set to off. Since the communication unit 54 is not used in such a case, the item 311 is displayed not to accept user operations. For example, as illustrated in FIG. 3A, the system control unit 50 displays the item 311 with shading to indicate that the item 311 is not selectable. Alternatively, the system control unit 50 may inform the user that the item 311 is not selectable by not displaying the item 311 or by making no response to operations on the item 311. If the item 310 is changed to on, the digital camera 100, as illustrated in FIG. 3B, displays the item 311 so that its setting is changeable. If the user operates the item 311 to enable the power saving function, the digital camera 100 displays a screen illustrated in FIG. 3C on the display unit 28.

Return to the description of FIG. 3A. If the user selects the item 312, the digital camera 100 displays a screen illustrated in FIG. 3D on the display unit 28. On this screen, the user can select the communication function(s) of the digital camera 100. An item 320 represents a communication function of transmitting image data, which is an example of the client function. An item 321 represents a communication function of remotely controlling the digital camera 100, which is an example of the server function, from an external apparatus. An item 322 represents a function of executing the client function and the server function in parallel. The digital camera 100 may also have other functions, such as a function of executing two or more client functions in parallel and a function of executing two or more server functions in parallel. The digital camera 100 may be configured such that the user can generate a new setting by freely combining server and client functions. Such a setting is recorded in a database recorded in the nonvolatile memory 56. Here, a case where the user selects the item 320 will be described as an example.

If the user selects the item 320, the digital camera 100 displays a connection setting menu illustrated in FIG. 3E. The setting type of the communication function selected by the user is displayed at the top right of the connection setting menu. If the user selects an item 330, the digital camera 100 executes the communication function recorded in setting 1. If the user selects an item 331, the digital camera 100 performs processing for changing the communication function recorded in setting 1. Next, the client and server functions of the digital camera 100 according to the present embodiment will be described.

<Client and Server Functions>

The client and server functions of the digital camera 100 according to the present embodiment will be described. In the present embodiment, as an example of the client function of the digital camera 100, a function by which the digital camera 100 transmits image data to an external server 400 will be described by using a network system illustrated in FIG. 4A. In the present embodiment, as an example of the server function of the digital camera 100, a function by which the digital camera 100 is remotely controlled from a web browser displayed on a personal computer (PC) 450 will be described by using a network system illustrated in FIG. 4B. In the present embodiment, the digital camera 100 will be described to connect wirelessly to the external server 400 and the PC 450. However, the digital camera 100 may connect to the external server 400 and the PC 450 in a wired manner. The functions will be individually described below.

Figure 4A:
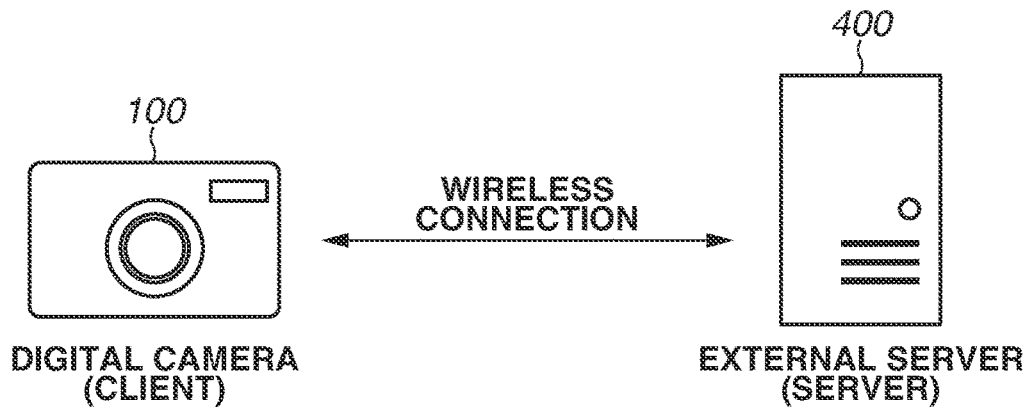
FIG. 4A illustrates an example of a network system in a case where the digital camera according to the first embodiment executes a client function.

An example of the processing by which the digital camera 100 transmits image data to the external server 400 will initially be described by using the network system illustrated in FIG. 4A. In the present embodiment, an example where the digital camera 100 transmits the image data by using the File Transfer Protocol (FTP) as a communication protocol will be described. The FTP is one of communication protocols using a client-server system. However, the digital camera 100 may use a communication protocol other than the FTP. For example, the digital camera 100 may use another communication protocol using the client-server system, such as the Picture Transfer Protocol (PTP) or the Hypertext Transfer Protocol (HTTP). In the network system, the digital camera 100 operates as a client, and the external server 400 operates as a server. Since the digital camera 100 operates as a client in this network system, the digital camera 100 actively controls connection and disconnection of the wireless connection.

In the network system, for example, the external server 400 functions as a cloud storage. The user can store image data captured by the digital camera 100 in the external server 400 by transmitting the image data to the external server 400. The user can then browse the image data captured by the digital camera 100 by accessing the external server 400.

An example of processing by which the digital camera 100 transmits image data to the external server 400 will be described with reference to FIG. 5. This processing of the digital camera 100 is implemented by the system control unit 50 executing software recorded in the nonvolatile memory 56. The processing is started when triggered by the digital camera 100 accepting an operation to transmit image data from the user.

In step S501, the system control unit 50 connects wirelessly to the external server 400 via the communication unit 54. Since the digital camera 100 operates as a client in this network system, the wireless connection between the digital camera 100 and the external server 400 is established by the system control unit 50 transmitting a connection request packet to the external server 400 via the communication unit 54 and the external server 400 responding to the connection request packet.

In step S502, the system control unit 50 transmits image data to the external server 400.

In step S503, the system control unit 50 determines whether a new operation to transmit image data is accepted from the user. If an operation to transmit image data is accepted from the user (YES in step S503), the processing proceeds to step S502. The system control unit 50 performs the processing of step S502 again and transmits the image data to the external server 400. If the system control unit 50 does not accept an operation to transmit image data from the user (NO in step S503), the processing proceeds to step S504.

In step S504, the system control unit 50 determines whether an operation to end the client function is made by the user. If the system control unit 50 determines that an operation to end the client function is made by the user (YES in step S504), the processing proceeds to step S507. If the system control unit 50 determines that no operation to end the client function is made by the user (NO in step S504), the processing proceeds to step S505.

In step S505, the system control unit 50 determines whether the power saving function is enabled. If the system control unit 50 determines that the power saving function is enabled (YES in step S505), the processing proceeds to step S506. If the system control unit 50 determines that the power saving function is disabled (NO in step S505), the processing returns to step S503. The power saving function will be described below.

In step S506, the system control unit 50 determines whether a predetermined time has elapsed since the operation to transmit image data was last accepted from the user. For example, if the system control unit 50 determines that five seconds have elapsed since the acceptance of the operation to transmit image data from the user, the system control unit 50 determines that a predetermined time has elapsed. The time may be freely set by the user. If the system control unit 50 determines that a predetermined time has elapsed since the acceptance of the operation to transmit image data from the user (YES in step S506), the processing proceeds to step S507. If the system control unit 50 determines that a predetermined time has not elapsed since the acceptance of the operation to transmit image data from the user (NO in step S506), the processing returns to step S503.

In step S507, the system control unit 50 disconnects the wireless connection with the external server 400. For example, the system control unit 50 disconnects the wireless connection with the external server 400 by transmitting a disconnection request packet to the external server 400 via the communication unit 54.

In step S508, the system control unit 50 stops power supply to the communication unit 54. This can reduce the power consumption of the digital camera 100.

The processing by which the digital camera 100 serving as a client transmits image data to the external server 400 has been described above. If the digital camera 100 is executing the client function as in the foregoing processing, the digital camera 100 disconnects the connection with the external server 400 based on the lapse of a predetermined time without acceptance of an operation from the user. The processing of the power saving function in the present processing is equivalent to processing for ending the client function. To transmit another piece of image data after the disconnection of the wireless connection with the external server 400, the digital camera 100 energizes the communication unit 54 and performs the present processing again.

In the present embodiment, the digital camera 100 transmits image data to the external server 400 based on the reception of the operation to transmit the image data from the user. However, the processing for transmitting image data may be started based on the capturing of the image data. Such a method can reduce the user's labor in transmitting image data since the operation to capture an image can also serve as the operation to transmit the image data.

Next, an example of the processing for remotely controlling the digital camera 100 from the web browser displayed on the PC 450 will be described by using the network system illustrated in FIG. 4B. In the present embodiment, an example where the digital camera 100 performs the processing by using the HTTP as the communication protocol will be described. In the network system, the digital camera 100 operates as a server, and the PC 450 operates as a client. Since the digital camera 100 operates as a server in the present network system, the PC 450 actively controls connection and disconnection of the wireless connection.

In the network system, for example, the user can remotely control the digital camera 100 by using the PC 450 as a remote controller. By operating the web browser displayed on the PC 450, the user can request the digital camera 100 to capture an image and to transmit the image data captured by the digital camera 100 to the PC 450.

Figure 6:
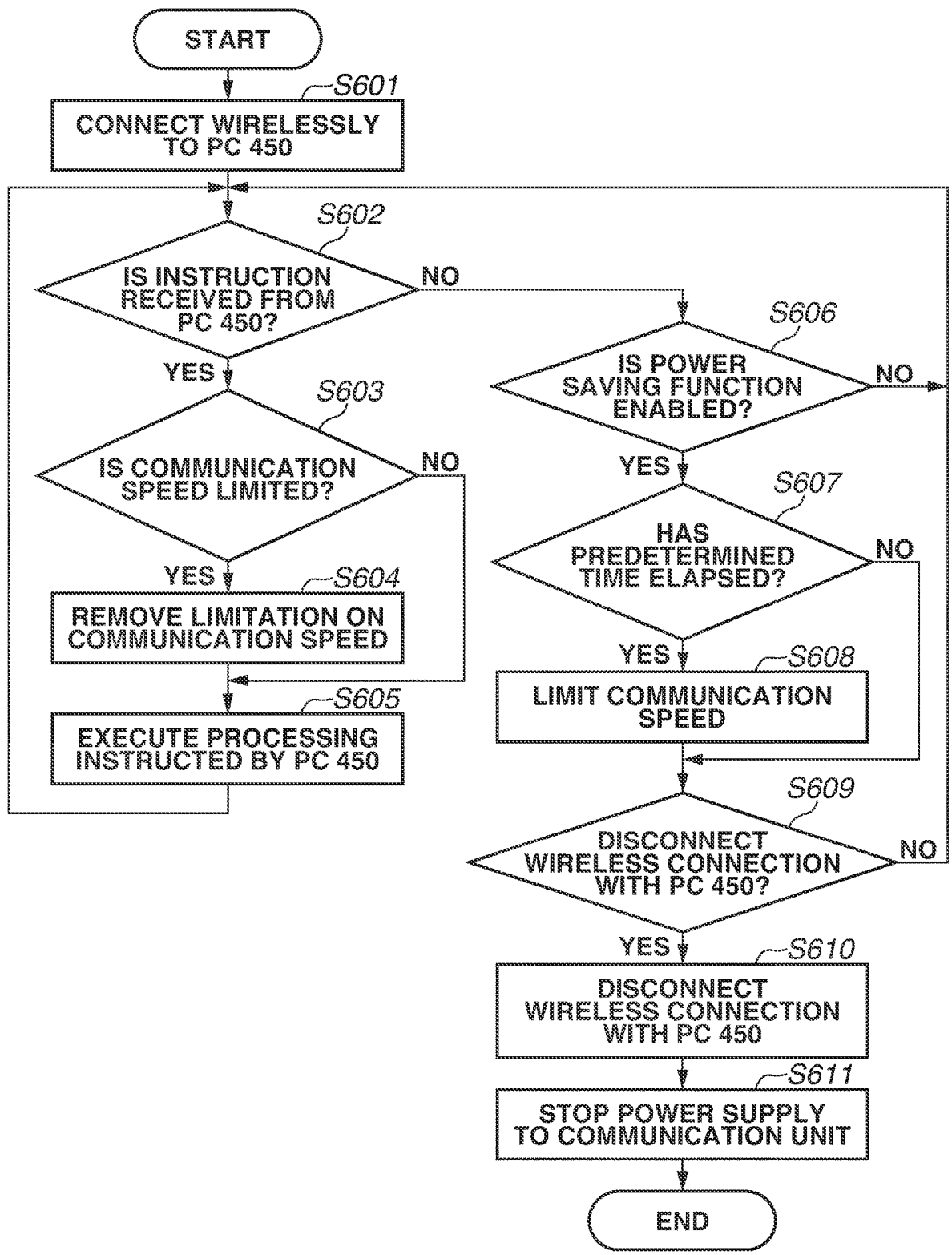
FIG. 6 is a flowchart illustrating an example of operation of the server function of the digital camera according to the first embodiment.

An example of the processing for remotely controlling the digital camera 100 by the PC 450 will be described with reference to FIG. 6. This processing of the digital camera 100 is implemented by the system control unit 50 executing the software recorded in the nonvolatile memory 56. The processing is started when triggered by the digital camera 100 receiving an operation to enable the server function from the user.

In step S601, the system control unit 50 wirelessly connects to the PC 450 via the communication unit 54. Since the digital camera 100 operates as a server in this network system, the wireless connection between the digital camera 100 and the PC 450 is established by the system control unit 50 receiving a connection request packet from the PC 450 via the communication unit 54 and responding to the connection request packet.

In step S602, the system control unit 50 determines whether an instruction is received from the PC 450. For example, the system control unit 50 determines whether an instruction to capture an image is accepted from the PC 450. If the system control unit 50 receives an instruction from the PC 450 (YES in step S602), the processing proceeds to step S603. If the system control unit 50 does not receive an instruction from the PC 450 (NO in step S602), the processing proceeds to step S606. The case where the system control unit 50 receives an instruction from the PC 450 will initially be described.

In step S603, the system control unit 50 determines whether communication speed is limited in step S608 to be described below. The processing for limiting the communication speed in step S608 is executed if the power saving function is enabled. If system control unit 50 is limiting the communication speed (YES in step S603), the processing proceeds to step S604. If the system control unit 50 is not limiting the communication speed (NO in step S603), the processing proceeds to step S605. The power saving function will be described below.

In step S604, the system control unit 50 removes the limitation on the communication speed with the PC 450. For example, the system control unit 50 changes link speed from 1 Mbps to 1 Gbps. The link speed of 1 Gbps is an example of the fastest speed among link speeds at which the digital camera 100 and the PC 450 can communicate. The processing of this step S604 is not performed if the power saving function is disabled.

In step S605, the system control unit 50 executes processing instructed by the PC 450. For example, if an instruction to capture an image is accepted from the PC 450 in step S602, the system control unit 50 captures an image by using the imaging unit 22 and records the captured image data in the recording medium 200. After the execution of the processing instructed by the PC 450, the processing returns to step S602 and the system control unit 50 waits until an instruction from the PC 450 is received. Next, the case where the system control unit 50 does not receive an instruction from the PC 450 in step S602 will be described.

In step S606, the system control unit 50 determines whether the power saving function is enabled. If the system control unit 50 determines that the power saving function is enabled (YES in step S606), the processing proceeds to step S607. If the system control unit 50 determines that the power saving function is disabled (NO in step S606), the processing returns to step S602. The power saving function will be described below.

In step S607, the system control unit 50 determines whether a predetermined time has elapsed since an instruction was last received from the PC 450. For example, if the system control unit 50 determines that five minutes have elapsed since the reception of an instruction from the PC 450, the system control unit 50 determines that a predetermined time has elapsed. The time may be freely set by the user. If the system control unit 50 determines that a predetermined time has elapsed since the reception of an instruction from the PC 450 (YES in step S607), the processing proceeds to step S608. If the system control unit 50 determines that a predetermined time has not elapsed since the reception of an instruction from the PC 450 (NO in step S607), the processing proceeds to step S609.

In step S608, the system control unit 50 limits the communication speed with the PC 450. For example, the system control unit 50 changes the link speed with the PC 450 to 1 Mbps. The processing of this step is performed if the power saving function is enabled.

In step S609, the system control unit 50 determines whether to disconnect the wireless connection with the PC 450. For example, the system control unit 50 determines whether to disconnect the wireless connection based on reception of a packet requesting disconnection of the wireless connection from the PC 450 via the communication unit 54. If the system control unit 50 determines to disconnect the wireless connection with the PC 450 (YES in step S609), the processing proceeds to step S610. If the system control unit 50 determines not to disconnect the wireless connection with the PC 450 (NO in step S609), the processing returns to step S602.

In step S610, the system control unit 50 disconnects the wireless connection with the PC 450.

In step S611, the system control unit 50 stops power supply to the communication unit 54.

The processing by which the digital camera 100 serving as a server is remotely controlled from the PC 450 has been described above.

In the present embodiment, the communication functions, namely, the client and server functions use respective different communication protocols. However, the digital camera 100 may communicate by using the same communication protocol for the communication functions.

Figure 4B:
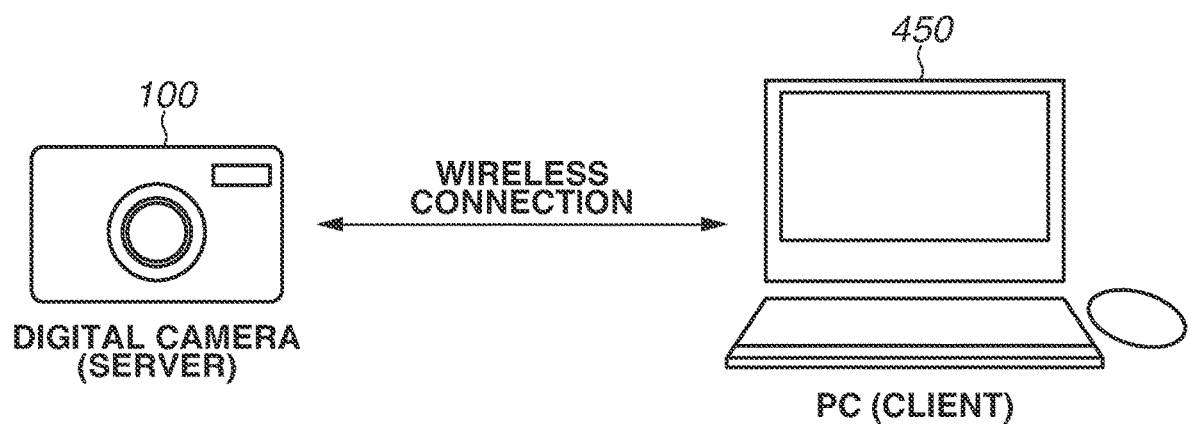
FIG. 4B illustrates an example of a network system in a case where the digital camera according to the first embodiment executes a server function.

In the present embodiment, the server apparatus and the client apparatus are directly connected as illustrated in FIGS. 4A and 4B. However, the two apparatuses may be connected to each other via a relay device such as an access point.

<Operation of Power Saving Function>

Now, the operation of the power saving function in each of the client and server functions of the digital camera 100 will be described. Initially, communication using the client-server system will be described.

In communication using the client-server system, the client apparatus basically transmits a predetermined request packet to the server apparatus, and the server apparatus communicates with the client apparatus in response to the predetermined request packet. In other words, when the client apparatus performs a communication with the server apparatus, the client apparatus starts the communication by transmitting the request packet to the server apparatus. In view of this, the client apparatus can be connected to the server apparatus at least only while communicating with the server apparatus. On the other hand, to stay on standby such that a request packet can be received from the client apparatus, the server apparatus desirably maintains connection with the client apparatus even when not communicating. In executing the power saving function in each of the client and server functions, the digital camera 100 according to the present embodiment therefore performs different processing as described with reference to FIGS. 5 and 6. The power saving function in the client function of the digital camera 100 will initially be described.

The function described with reference to FIG. 5 by which the digital camera 100 transmits image data to the external server 400 will be described here as an example of the client function of the digital camera 100. As described in steps S505 and S506 of FIG. 5, the digital camera 100 disconnects the wireless connection with the external server 400 based on the lapse of a predetermined time without a user operation. The reason why the connection is not disconnected until a predetermined time elapses is that the user can transmit additional image data immediately after transmission of image data. The reason why the connection with the external server 400 is disconnected is that if the digital camera 100 is not operated by the user before the lapse of the predetermined time, the digital camera 100 can be determined to be less likely to be operated by the user. The digital camera 100 can thus execute the client function and reduce power consumption as well. By disabling the communication functions, for example by stopping the power supply to the communication unit 54, the digital camera 100 can further reduce the power consumption. In the present embodiment, in a case where the digital camera 100 executes the power saving function in the client function, the digital camera 100 stops the power supply to the communication unit 54. Next, the power saving function in the server function of the digital camera 100 will be described.

The function described with reference to FIG. 6 by which the digital camera 100 is remotely controlled from the PC 450 will be described as an example of the server function of the digital camera 100. As described in steps S606 to S608 of FIG. 6, the digital camera 100 does not disconnect the connection with the PC 450 even if a predetermined time elapses without reception of an instruction from the PC 450. As described above, the reason is that the server apparatus stays on standby such that a request packet can be at least received from the client apparatus. The digital camera 100 thus reduces the link speed with the PC 450, thereby reducing the amount of data received per unit time to reduce power consumption while maintaining the connection with the PC 450. If an instruction is received from the PC 450, as described in steps S603 and S604 of FIG. 6, the digital camera 100 increases and restores the link speed to the original link speed. This enables the digital camera 100 to response to an instruction from the PC 450 without much delay when the instruction is given from the PC 450.

<Operation of Power Saving Function in Case Where Client and Server Functions are Executed in Parallel>

Now, an operation of the power saving function in a case where a plurality of communication functions according to the present embodiment is executed in parallel will be described. Suppose that the user uses at least one of the communication functions. In such a case, since the digital camera 100 is being operated by the user, the digital camera 100 does not execute the power saving function even if none of the functions has been used for a predetermined time or more. If all the plurality of communication functions is client functions or server functions, the digital camera 100 may execute the power saving function based on a fact that none of the plurality of communication functions has been operated for a predetermined time or more. The reason is that the power saving functions of the same types of communication functions are unlikely to interfere with each other.

By contrast, if the plurality of communication functions includes both a client function and a server function, the execution of the power saving function by the digital camera 100 based on the fact that the user has not used any of the functions for a predetermined time or more can cause a trouble. An example of the trouble is that the processing for stopping the power supply to the communication unit 54 of the digital camera 100 by the power saving function of the client function interferes with the foregoing processing for continuing to energize the communication unit 54 of the digital camera 100 by the power saving function of the server function. The power saving function of the unused client function can thus interfere with the server function used in parallel. In the present embodiment, the digital camera 100 thus does not execute the power saving function of the client function but executes the power saving function of the server function in such a case.

Figure 7:
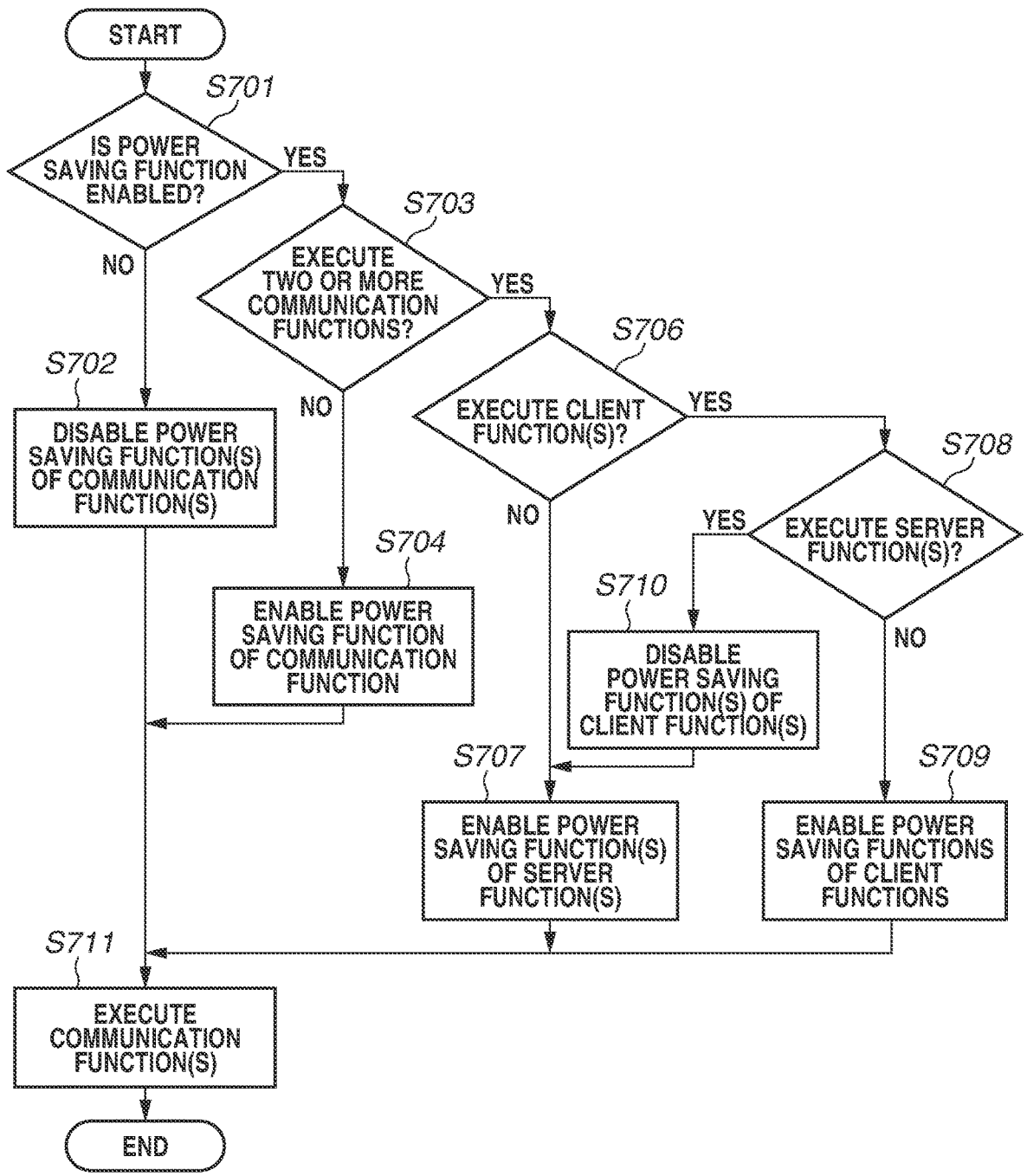
FIG. 7 is a flowchart illustrating an example of operation in a case where the digital camera according to the first embodiment executes a plurality of communication functions.

Processing for setting the power saving function of the digital camera 100 in the case where a plurality of communication functions is executed in parallel will be described with reference to FIG. 7. This processing of the digital camera 100 is implemented by the system control unit 50 executing the software recorded in the nonvolatile memory 56. The processing is started when triggered by the execution of a communication function or functions of the digital camera 100. For example, the digital camera 100 starts the processing in response to the selection of the item 330 by the user from the connection setting menu illustrated in FIG. 3E.

In step S701, the system control unit 50 determines whether the power saving function is enabled. For example, the system control unit 50 determines whether the item 311 of the communication settings illustrated in FIG. 3C is set to on or off. If the system control unit 50 determines that the power saving function is disabled (NO in step S701), the processing proceeds to step S702. In step S702, the system control unit 50 disables the power saving function(s) of the communication function(s) to be executed. In step S711, the system control unit 50 executes the communication function(s). If the system control unit 50 determines that the power saving function is enabled (YES in step S701), the processing proceeds to step S703.

In step S703, the system control unit 50 determines whether to execute two or more communication functions. For example, if a single communication function is set as represented by the items 320 and 321 in FIG. 3D, the system control unit 50 determines not to execute two or more communication functions. For example, if a plurality of communication functions is set as represented by the item 322 in FIG. 3D, the system control unit 50 determines to execute two or more communication functions. If the system control unit 50 determines not to execute two or more communication functions (NO in step S703), the processing proceeds to step S704. In step S704, the system control unit 50 enables the power saving function of the communication function to be executed. In step S711, the system control unit 50 executes the communication function. If the system control unit 50 determines to execute two or more communication functions (YES in step S703), the processing proceeds to step S706.

In step S706, the system control unit 50 determines whether to execute a client function or client functions. For example, the system control unit 50 determines whether to execute the foregoing function of transmitting image data. If no client function is determined to be executed (NO in step S706), the system control unit 50 is to execute only a plurality of server functions. In such a case, the processing proceeds to step S707. In step S707, the system control unit 50 enables the power saving functions of the respective server functions. In step S711, the system control unit 50 executes the plurality of server functions in parallel. If the system control unit 50 determines to execute a client function or client functions (YES in step S706), the processing proceeds to step S708.

In step S708, the system control unit 50 determines whether to execute a server function or server functions. For example, the system control unit 50 determines whether to execute the foregoing function of remotely controlling the digital camera 100 from the web browser. If no server function is determined to be executed (NO in step S708), the system control unit 50 is to execute only a plurality of client functions. In such a case, the processing proceeds to step S709. In step S709, the system control unit 50 enables the power saving functions of the respective client functions. In step S711, the system control unit 50 executes the plurality of client functions in parallel.

If the system control unit 50 executes a server function or server functions (YES in step S708), the processing proceeds to step S710. In step S710, the system control unit 50 disables the power saving function(s) of the client function(s). In step S707, the system control unit 50 enables the power saving function(s) of the server function(s). In step S711, the system control unit 50 executes the plurality of communication functions in parallel.

The processing for setting the power saving functions of the digital camera 100 in executing a plurality of communication functions in parallel has been described above. In such a manner, the digital camera 100 can use the power saving functions even if the client and server functions are executed in parallel as the communication functions.

In the present embodiment, the system control unit 50 performs the processing for setting the power saving functions before executing the communication functions. However, the processing may be performed after the communication functions start to be executed. For example, if the condition to execute the power saving functions of the communication functions is satisfied, the system control unit 50 performs the processing for setting the power saving functions of the communication functions. After the processing for setting the power saving functions is performed, the system control unit 50 executes the power saving functions.

In step S710, the system control unit 50 disables the power saving function(s) of the client function(s), but does not disable (change to off) the power saving function of the item 311 illustrated in FIG. 3A. This enables the digital camera 100 to use the power saving function(s) of the client function(s) without changing the setting of the power saving function(s) if the client function(s) alone is/are enabled next time.

Figure 8A:
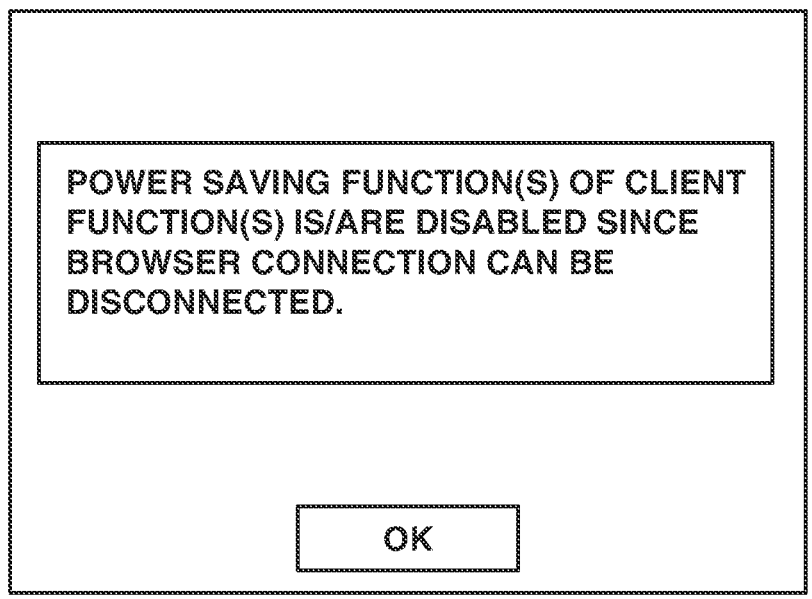
FIG. 8A illustrates an example of a notification screen displayed when the digital camera according to the first embodiment disables a power saving function.

In step S710, in disabling the power saving function(s) of the client function(s), the digital camera 100 may display a screen illustrated in FIG. 8A on the display unit 28 to notify the user that the power saving function(s) is/are disabled. The digital camera 100 may display the notification on the extra-viewfinder display unit 43 instead of displaying the notification on the display unit 28.

Figure 8B:
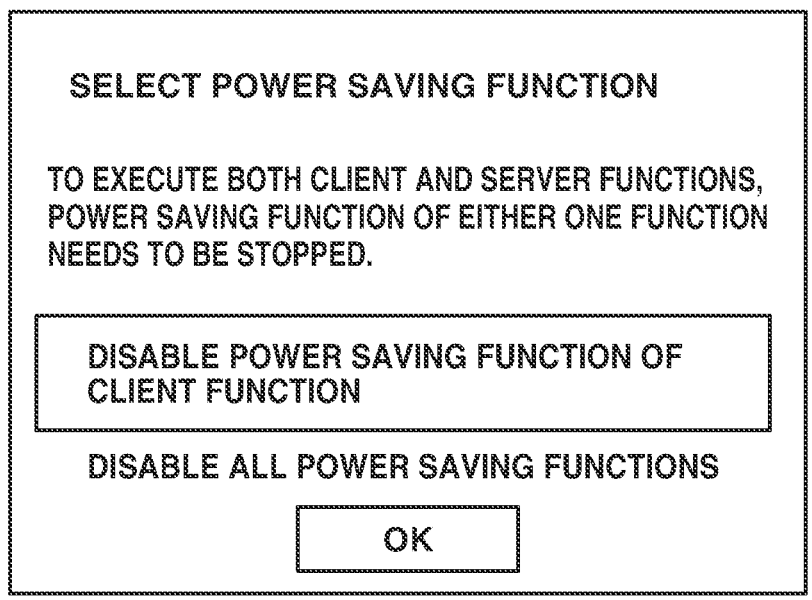
FIG. 8B illustrates an example of a screen displayed when a user selects a power saving function of the digital camera according to first embodiment.

In executing the server and client functions in parallel, the system control unit 50 disables the power saving function(s) of the client function(s) and enables the power saving function(s) of the server function(s). However, the system control unit 50 may disable the power saving functions of both the client and server functions. In such a case, for example, the system control unit 50 may display a warning screen as illustrated in FIG. 8B and make the user select the operation of the power saving functions of the digital camera 100 before executing the communication functions. In disabling both the power saving functions, the system control unit 50 may disable (change to off) the power saving function of the item 311 illustrated in FIG. 3A.

The digital camera 100 can have an automatic power off function of reducing the power consumption of the digital camera 100 based on the lapse of a predetermined time without a user operation, aside from the power saving functions of the client and server functions. For example, the digital camera 100 performs processing for stopping the energization of the display unit 28 and processing for stopping the energization of the communication unit 54 by the automatic power off function. With the automatic power off function, the digital camera 100 can further reduce the power consumption by executing the automatic power off function in addition to the power saving functions of the communication functions. For example, since the processing for stopping the energization of the display unit 28 does not interfere with the operation of the power saving functions of the communication functions, the digital camera 100 performs the processing for stopping the energization of the display unit 28 as the automatic power off function even during execution of the server and/or client function(s). By contrast, stopping the energization of the communication unit 54 interferes with the operation of the communication functions being executed. The digital camera 100 therefore does not perform the processing for stopping the energization of the communication unit 54 as the automatic power off function while a communication function or functions is/are executed. The digital camera 100 thus determines whether to operate the automatic power off function during execution of the communication functions, depending on the processing of the automatic power-off function. In the present embodiment, the digital camera 100 does not execute the automatic power off function if a communication function or functions is/are being executed.

Figure 9:
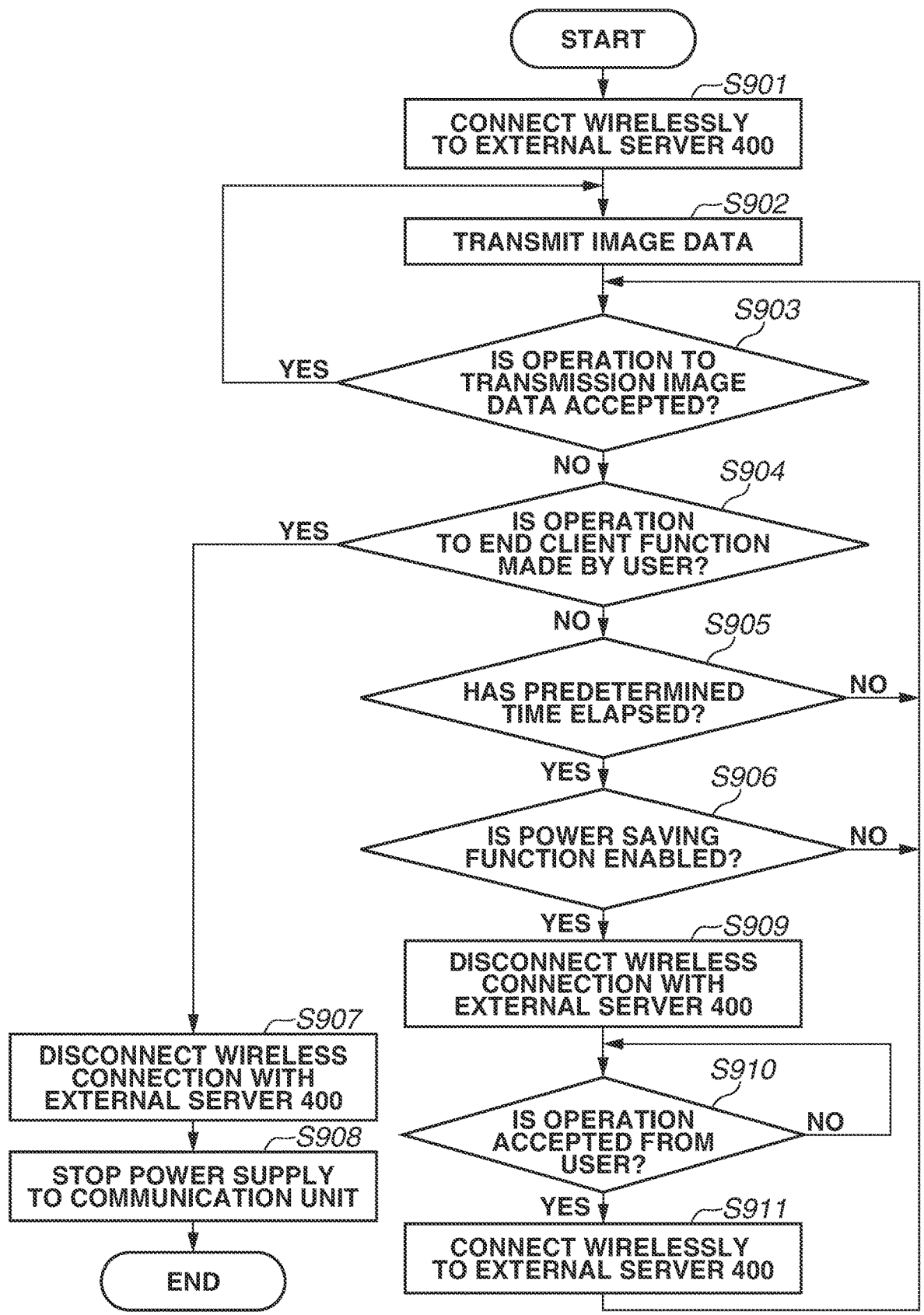
FIG. 9 is a flowchart illustrating an example of operation of the client function in a case where the digital camera according to the first embodiment changes the processing of the power saving function.

The processing of step S710 may be such that the system control unit 50 modifies the power saving function(s) of the client function(s) so that the power supply to the communication unit 54 will not be stopped. The reason is that enabling the power saving function(s) of the client function(s) does not interfere with the power saving function(s) of the server function(s) as long as the communication unit 54 is energized. The processing of a client function in a case where such processing is applied will be described with reference to FIG. 9 by using the foregoing processing for transmitting image data as an example. This processing of the digital camera 100 is implemented by the system control unit 50 executing the software recorded in the nonvolatile memory 56. The processing is started when triggered by the digital camera 100 accepting an operation to transmit image data from the user.

Figure 5:
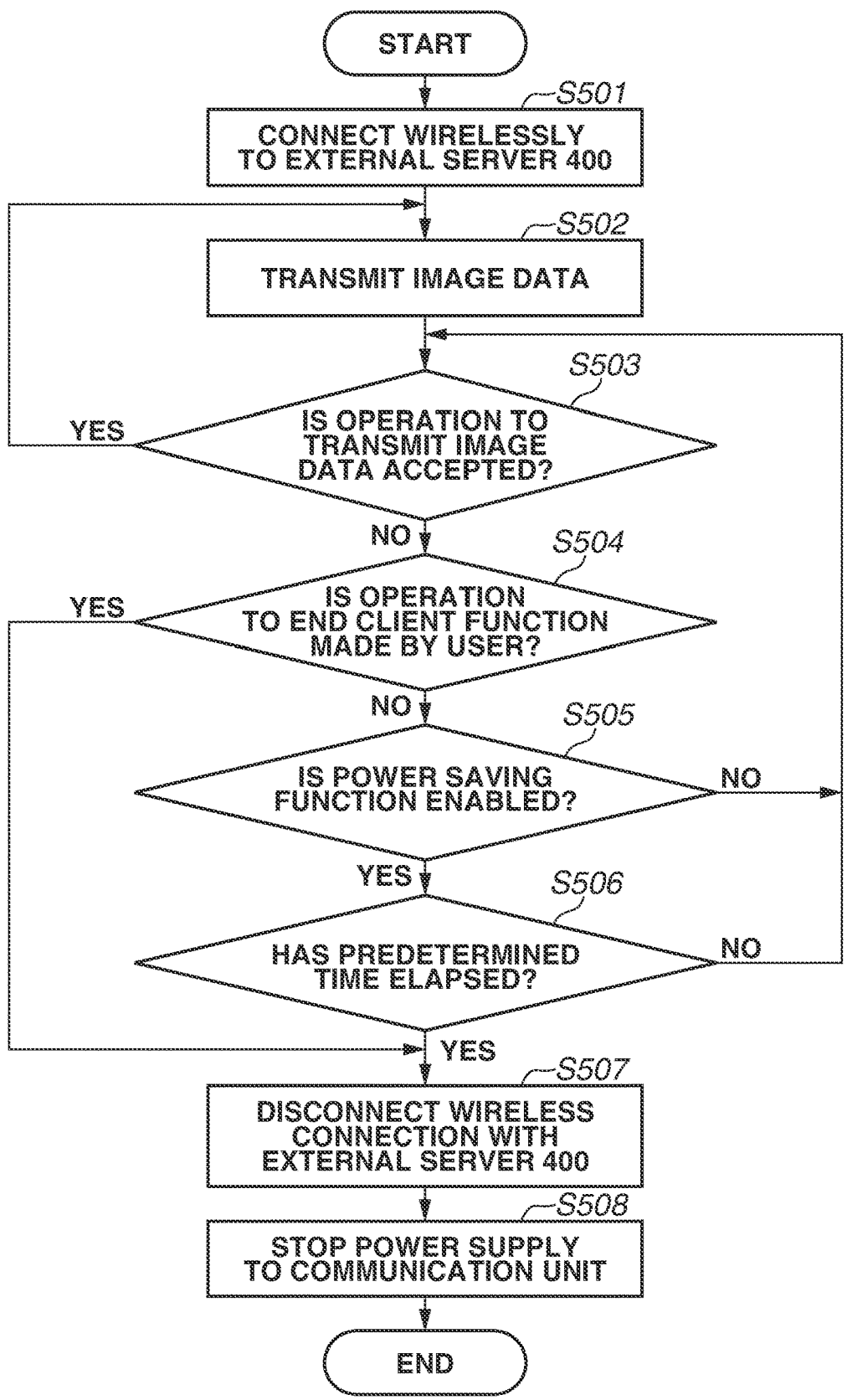
FIG. 5 is a flowchart illustrating an example of operation of the client function of the digital camera according to the first embodiment.

Steps S901 to S905 are similar to steps S501 to S504 and S506 of FIG. 5, respectively. A description thereof will thus be omitted.

In step S906, the system control unit 50 determines whether the power saving function is enabled. If the system control unit 50 determines that the power saving function is enabled (YES in step S906), the processing proceeds to step S909. If the system control unit 50 determines that the power saving function is disabled (NO in step S906), the processing returns to step S903.

In step S909, the system control unit 50 disconnects the wireless connection with the external server 400. Here, the system control unit 50 maintains the energization of the communication unit 54.

In step S910, the system control unit 50 determines whether an operation is accepted from the user. For example, the system control unit 50 determines whether the operation unit 70 is operated by the user. The system control unit 50 may determines that an operation is accepted from the user based on reception of data from the external server 400 or other external apparatuses via the communication unit 54. If the system control unit 50 determines that no operation is accepted from the user (NO in step S910), the processing of this step is repeated. If the system control unit 50 determines that an operation is accepted from the user (YES in step S910), the processing proceeds to step S911.

In step S911, the system control unit 50 connects wirelessly to the external server 400 and resumes communication with the external server 400. By such processing, the digital camera 100 returns from the power saving state to the state of executing the communication function. After the processing of step S911, the processing returns to step S903.

Steps S907 and S908 are similar to steps S507 and S508 of FIG. 5, respectively. A description thereof will thus be omitted.

The processing by which the digital camera 100 with the modified power saving function transmits image data to the external server 400 has been described above. As in the foregoing processing, by the power saving function of the client function, the digital camera 100 disconnects the connection with the wirelessly connected server apparatus to save power while maintaining the energization of the communication unit 54. Since the digital camera 100 maintains the energization of the communication unit 54, the power saving processing of the client function does not interfere with the processing of the server function. By thus modifying the power saving function based on the communication functions to be executed in parallel, the digital camera 100 can use the plurality of communication functions and use the power saving functions thereof as well.

If both the automatic power off function and the power saving function of the client function are enabled, a first time up to the execution of the automatic power off function is preferably longer than a second time up to the execution of the power saving function of the client function. A case where the automatic power off function of the digital camera 100 includes the processing for stopping the energization of the communication unit 54 will be described as an example. Since the energization of the communication unit 54 is stopped by execution of the automatic power off function, the digital camera 100 reconnects to the external server 400 by energizing the communication unit 54 again. On the other hand, the power saving function of the client function disconnects the connection with the wirelessly connected server apparatus while maintaining the energization of the communication unit 54. The digital camera 100 thus simply reconnects to the external server 400. The time for the digital camera 100 to energize the communication unit 54 again and reconnect to the external server 400 is usually longer than the time for the digital camera 100 maintaining the energization of the communication unit 54 to reconnect to the external server 400. The shorter the time during which the user does not use the digital camera 100, the higher the possibility for the digital camera 100 to be used again. The longer the time during which the user does not use the digital camera 100, the lower the possibility for the digital camera 100 to be used again. The order of operation of the power saving function and the automatic power off function therefore is preferably the ascending order of time for the digital camera 100 to reconnect to the external server 400. Specifically, in the foregoing case, the first time is preferably longer than the second time.

The power saving function described above is particularly useful to portable communication apparatuses with a battery power supply. The reason is that a portable communication apparatus such as a digital camera have a limited battery capacity, and thus, the reduction of the power consumption is more useful than to an apparatus powered by a commercial power supply.

In the first embodiment, the digital camera 100 has the power saving functions for both the client and server functions. A second embodiment describes a case where a digital camera 100 has a power saving function for a client function but not one for a server function. The reason why the server function does not have a power saving function is that a server apparatus stays on standby such that a request packet can be at least received from a client apparatus as described above. On the other hand, a client apparatus can be connected to a server apparatus at least only while communicating with the server apparatus as described above. In the present embodiment, the digital camera 100 thus has the power saving function for the client function.

The digital camera 100 according to the present embodiment has a similar configuration to the first embodiment. A description thereof will thus be omitted. A network system according to the present embodiment is also similar to that of the first embodiment. A description thereof will thus be omitted.

<Server Function>

Figure 10:
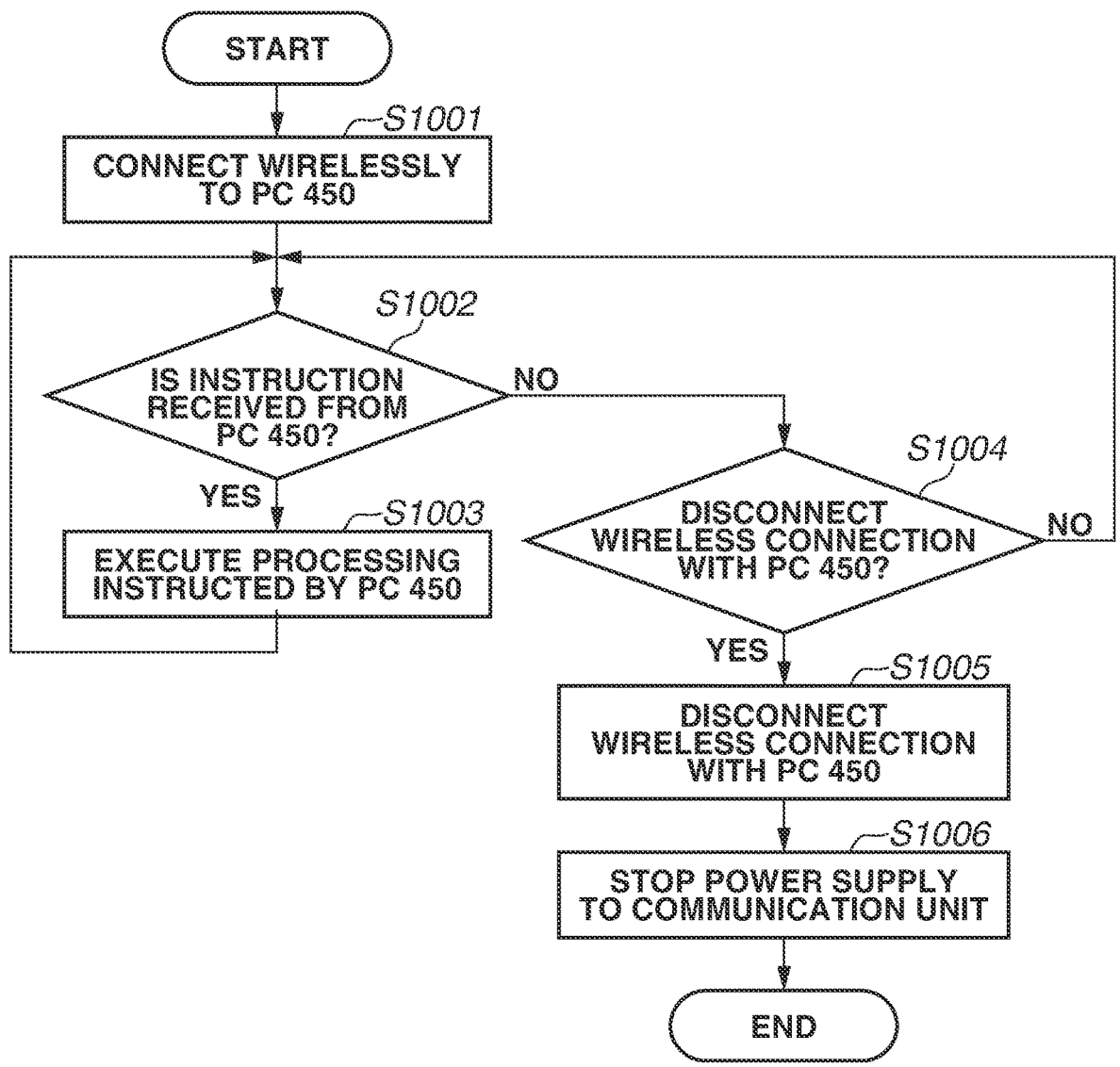
FIG. 10 is a flowchart illustrating an example of operation of a server function of a digital camera according to a second embodiment.

The server function of the digital camera 100 according to the present embodiment will be described with reference to FIG. 10. A function by which the digital camera 100 is remotely controlled by the PC 450 will be described as an example of the server function. This processing of the digital camera 100 is implemented by the system control unit 50 executing software recorded in the nonvolatile memory 56. The processing is started when triggered by the digital camera 100 accepting an operation to enable the server function from the user.

In step S1001, the system control unit 50 connects wirelessly to the PC 450 via the communication unit 54. Since the digital camera 100 operates as a server in this network system, the wireless connection between the digital camera 100 and the PC 450 is established by the system control unit 50 receiving a connection request packet from the PC 450 via the communication unit 54 and responding to the connection request packet. The processing of this step corresponds to that of step S601 in FIG. 6.

In step S1002, the system control unit 50 determines whether an instruction is received from the PC 450. For example, the system control unit 50 determines whether an instruction to capture an image is received from the PC 450. If the system control unit 50 receives an instruction from the PC 450 (YES in step S1002), the processing proceeds to step S1003. If the system control unit 50 does not receive an instruction from the PC 450 (NO in step S1002), the processing proceeds to step S1004. The processing of this step corresponds to that of step S602 in FIG. 6.

In step S1003, the system control unit 50 executes processing instructed by the PC 450. For example, if an instruction to capture an image is received from the PC 450 in step S1002, the system control unit 50 captures an image by using the imaging unit 22, and records the captured image data in the recording medium 200. After the execution of the processing instructed by the PC 450, the processing returns to step S1002 and the system control unit 50 waits until an instruction is received from the PC 450. The processing of this step corresponds to that of step S605 in FIG. 6. Next, a case where the system control unit 50 does not receive an instruction from the PC 450 in step S1002 (NO in step S1002) will be described.

In step S1004, the system control unit 50 determines whether to disconnect the wireless connection with the PC 450. For example, the system control unit 50 determines whether to disconnect the wireless connection based on reception of a packet requesting disconnection of the wireless connection from the PC 450 via the communication unit 54. If the system control unit 50 determines to disconnect the wireless connection with the PC 450 (YES in step S1004), the processing proceeds to step S1005. If the system control unit 50 determines not to disconnect the wireless connection with the PC 450 (NO in step S1004), the processing returns to step S1002. The processing of this step corresponds to that of step S609 in FIG. 6.

In step S1005, the system control unit 50 disconnects the wireless connection with the PC 450.

In step S1006, the system control unit 50 stops power supply to the communication unit 54.

The processing by which the digital camera 100 serving as a server is remotely controlled from the PC 450 has been described above. Unlike the first embodiment, the digital camera 100 according to the present embodiment thus does not execute the power saving function even in a state where no instruction is received from the client apparatus during execution of the server function.

The client function of the digital camera 100 according to the present embodiment is similar to that of the digital camera 100 according to the first embodiment. A description thereof will thus be omitted.

<Operation of Power Saving Functions in Case Where Client and Server Functions are Executed in Parallel>

Now, an operation of the power saving functions in a case where a plurality of communication functions is executed in parallel according to the present embodiment will be described. Also in the present embodiment, the power saving function of the client function of the digital camera 100 includes processing for stopping the power supply to the communication unit 54. As in the first embodiment, the power saving function of the client function can thus interfere with the server function used in parallel. In the present embodiment, the digital camera 100 therefore executes the power saving function of the server function in such a case, instead of executing the power saving function of the client function.

Figure 11:
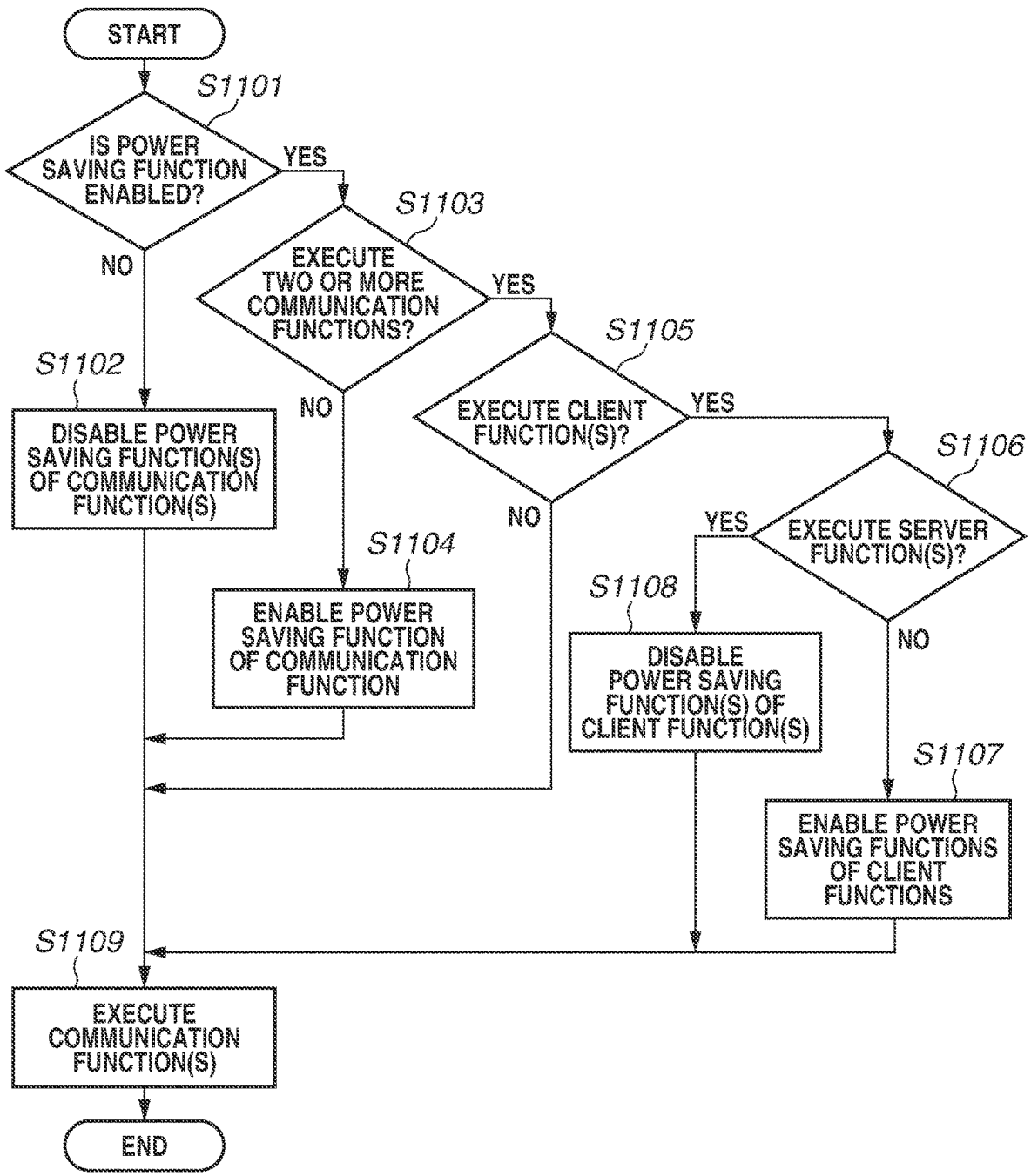
FIG. 11 is a flowchart illustrating an example of operation in a case where the digital camera according to the second embodiment executes a plurality of communication functions.

Processing for setting the power saving function of the digital camera 100 in the case where a plurality of communication functions is executed in parallel will be described with reference to FIG. 11. This processing of the digital camera 100 is implemented by the system control unit 50 executing software recorded in the nonvolatile memory 56. The processing is started when triggered by the execution of a communication function or functions of the digital camera 100. For example, the digital camera 100 starts the processing in response to selection of the item 330 by the user from the connection setting menu illustrated in FIG. 3E.

In step S1101, the system control unit 50 determines whether the power saving function is enabled. For example, the system control unit 50 determines whether the item 311 of the communication settings illustrated in FIG. 3C is set to on or off. If the system control unit 50 determines that the power saving function is disabled (NO in step S1101), the processing proceeds to step S1102. In step S1102, the system control unit 50 disables the power saving function(s) of the communication function(s) to be executed. In step S1109, the system control unit 50 executes the communication function(s). If the system control unit 50 determines that the power saving function is enabled (YES in step S1101), the processing proceeds to step S1103.

In step S1103, the system control unit 50 determines whether to execute two or more communication functions. For example, if a single communication function is set as represented by the items 320 and 321 in FIG. 3D, the system control unit 50 determines not to execute two or more communication functions. If a plurality of communication functions is set as represented by the item 322 in FIG. 3D, the system control unit 50 determines to execute two or more communication functions. If the system control unit 50 determines not to execute two or more communication functions (NO in step S1103), the processing proceeds to step S1104. In step S1104, the system control unit 50 enables the power saving function of the communication function to be executed. In step S1109, the system control unit 50 executes the communication function. If the system control unit 50 determines to execute two or more communication functions (YES in step S1103), the processing proceeds to step S1105.

In step S1105, the system control unit 50 determines whether to execute a client function or client functions. For example, the system control unit 50 determines whether to execute the foregoing function of transmitting image data. If no client function is determined to be executed (NO in step S1105), the system control unit 50 is to execute only a plurality of server functions. In such a case, the processing proceeds to step S1109. In step S1109, the system control unit 50 executes the plurality of server functions in parallel. If the system control unit 50 determines to execute a client function or client functions (YES in step S1105), the processing proceeds to step S1106.

In step S1106, the system control unit 50 determines whether to execute a server function or server functions. For example, the system control unit 50 determines whether to execute the foregoing function of remotely controlling the digital camera 100 from a web browser. If no server function is determined to be executed (NO in step S1106), the system control unit 50 is to execute only a plurality of client functions. In such a case, the processing proceeds to step S1107. In step S1107, the system control unit 50 enables the power saving functions of the respective client functions. In step S1109, the system control unit 50 executes the plurality of client functions in parallel.

If the system control unit 50 determines to execute a server function or server functions (YES in step S1106), the processing proceeds to step S1108. In step S1108, the system control unit 50 disables the power saving function(s) of the client function(s). In step S1109, the system control unit 50 executes the plurality of communication functions in parallel.

The processing for setting the power saving function of the digital camera 100 in executing a plurality of communication functions in parallel has been described above. The digital camera 100 can thereby execute the client and server functions in parallel without the user manually changing the setting of the power saving functions of the communication functions.

Other Embodiments

Various embodiments of the present disclosure can be implemented by processing for supplying a program for implementing one or more functions of the foregoing described embodiments to a system or an apparatus via a network or a recording medium, and reading and executing the program by one or more processors in a computer of the system or apparatus. A circuit (for example, an application specific integrated circuit (ASIC)) for implementing one or more functions may be used for implementation.

The present disclosure is not limited to the foregoing described embodiments, and in the phase of implementation, the components can be modified and practiced without departing from the gist thereof. Various inventions can be formed by appropriately combining a plurality of components described in the foregoing embodiments. For example, several components may be omitted from among all the components described in the described embodiments. Components according to different described embodiments may be combined as appropriate.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described above, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2019-073611, filed Apr. 8, 2019, which is hereby incorporated by reference herein in its entirety.

What is claimed is:

1. A communication apparatus comprising:
a communicator;
a user interface; and
one or more processors,
wherein the one or more processors are configured to communicate with an external apparatus via the communicator,
wherein the one or more processors are configured to accept a user operation by the user interface;
wherein the one or more processors are configured to execute communication functions including a client function for operating as a client in communicating with the external apparatus via the communicator and a server function for operating as a server in communicating with the external apparatus via the communicator,
wherein the one or more processors are configured to, in a case where the client function for operating as a client is executed and the server function for operating as a server is not executed, execute a first power saving function for disabling the communication function based on a lapse of a predetermined time without acceptance of the user operation,
wherein the one or more processors are configured to, in a case where both the client and server functions are executed in parallel, not execute the first power saving function.

2. The communication apparatus according to claim 1, wherein the one or more processors are is configured to, in a case where the server function for operating as a server is executed and the client function for operating as a client is not executed, execute a second power saving function for maintaining connection with the connected external apparatus and reducing power consumption of the communicator based on the lapse of the predetermined time without acceptance of the user operation.

3. The communication apparatus according to claim 1, wherein the one or more processors are configured to, in a case where the client and server functions are executed in parallel, execute the second power saving function based on the lapse of the predetermined time without acceptance of the user operation.

4. The communication apparatus according to claim 2, wherein the one or more processors are configured to, in a case where both the client and server functions are executed in parallel, further execute a third power saving function for disconnecting the connection with the connected external apparatus and maintaining the communication functions based on the lapse of the predetermined time without acceptance of the user operation, when the one or more processors are executing the client function, and execute the second power saving function based on the lapse of the predetermined time without acceptance of the user operation, when the one or more processors are executing the server function.

5. The communication apparatus according to claim 2, wherein the one or more processors are configured to, in a case where the client and server functions are executed in parallel, disable the first and second power saving functions.

6. The communication apparatus according to claim 2, wherein the one or more processors are configured to, in a case where the second power saving function is executed in the server function, limit communication speed with the connected external apparatus.

7. The communication apparatus according to claim 6, wherein the one or more processors are configured to, in a case where the second power saving function is executed in the server function, reduce link speed with the connected external apparatus.

8. The communication apparatus according to claim 1, wherein the one or more processors are configured to, in a case where the first power saving function is executed, end the client function being executed.

9. The communication apparatus according to claim 1,
wherein the one or more processors are configured to further have an automatic power off function, and
wherein the one or more processors are configured not to, in a case where at least one of the client and server functions is being executed, execute the automatic power off function.

10. The communication apparatus according to claim 1, wherein the server function is a function for accepting an operation on the communication apparatus from the connected external apparatus via the communicator.

11. The communication apparatus according to claim 1, wherein the client function is a function for transmitting image data to the connected external apparatus.

12. The communication apparatus according to claim 1, wherein the user interface is configured to accept the user operation via an operation member or the communicator.

13. The communication apparatus according to claim 1, wherein the server function is a function for providing the external apparatus with a service based on a request received from the external apparatus via the communicator.

14. The communication apparatus according to claim 1, wherein the client function is a function for requesting the external apparatus to provide a service via the communicator.

15. A control method of a communication apparatus including a communicator and a user interface, the control method comprising:
communicating with an external apparatus by the communicator,
accepting a user operation by the user interface,
executing a client function for operating as a client function for operating as a client in communicating with the external apparatus via the communicator and/ or a server function for operating as a server in communicating with the external apparatus via the communicator;
in a case where the client function for operating as a client is executed and the server function for operating as a server is not executed, executing a first power saving function for disabling the communication function based on a lapse of a predetermined time without acceptance of the user operation;
in a case where both the client and server functions are executed in parallel, controlling so as not to execute at least the first power saving function.

16. A non-transitory recording medium on which a program for causing a communication apparatus to execute a process is stored, the communication apparatus including a communicator and a operation unit user interface, the process comprising:
communicating with an external apparatus by the communicator,
accepting a user operation by the user interface,
executing a client function for operating as a client function for operating as a client in communicating with the external apparatus via the communicator and/ or a server function for operating as a server in communicating with the external apparatus via the communicator;
in a case where the client function for operating as a client is executed and the server function for operating as a server is not executed, executing a first power saving function for disabling the communication function based on a lapse of a predetermined time without acceptance of the user operation;
in a case where both the client and server functions are executed in parallel, controlling so as not to execute at least the first power saving function.

* * * * *